(12) United States Patent
Schaefer et al.

(10) Patent No.: US 7,700,062 B2
(45) Date of Patent: Apr. 20, 2010

(54) METHODS FOR SYNTHESIZING PRECIPITATED SILICA AND USE THEREOF

(75) Inventors: Dale W. Schaefer, Cincinnati, OH (US); Chunyan Chen, Ann Arbor, MI (US); Arthur Jing-Min Yang, Bethesda, MD (US)

(73) Assignee: University of Cincinnati, Cincinnati, OH (US)

( * ) Notice: Subject to any disclaimer, the term of this patent is extended or adjusted under 35 U.S.C. 154(b) by 920 days.

(21) Appl. No.: 10/399,177

(22) PCT Filed: Oct. 12, 2001

(86) PCT No.: PCT/US01/32114

§ 371 (c)(1), (2), (4) Date: Nov. 24, 2003

(87) PCT Pub. No.: WO02/30818

PCT Pub. Date: Apr. 18, 2002

(65) Prior Publication Data

US 2005/0228106 A1    Oct. 13, 2005

Related U.S. Application Data

(60) Provisional application No. 60/240,597, filed on Oct. 13, 2000, provisional application No. 60/239,993, filed on Oct. 13, 2000.

(51) Int. Cl.
    *C01B 33/12* (2006.01)
(52) U.S. Cl. ................ 423/339; 423/324; 423/335
(58) Field of Classification Search ............. 423/339
    See application file for complete search history.

(56) References Cited

U.S. PATENT DOCUMENTS

| | | | | |
|---|---|---|---|---|
| 2,763,533 A | * | 9/1956 | Ashley et al. | 423/330.1 |
| 3,857,925 A | * | 12/1974 | Sirianni et al. | 423/339 |
| 4,040,858 A | * | 8/1977 | Wason | 106/466 |
| 4,704,425 A | * | 11/1987 | Lagarde et al. | 524/492 |
| 4,732,213 A | * | 3/1988 | Bennett et al. | 166/292 |
| 4,842,838 A | | 6/1989 | Chevallier | |
| 4,954,327 A | * | 9/1990 | Blount | 423/338 |
| 5,403,570 A | | 4/1995 | Chevallier et al. | 423/339 |
| 5,705,137 A | | 1/1998 | Goerl et al. | 423/335 |
| 6,284,503 B1 | * | 9/2001 | Caldwell et al. | 435/181 |
| 6,486,216 B1 | * | 11/2002 | Keiser et al. | 516/82 |
| 6,500,870 B1 | * | 12/2002 | Linsten et al. | 516/81 |

FOREIGN PATENT DOCUMENTS

| | | |
|---|---|---|
| CA | 2 291 230 A1 | 12/1998 |
| EP | 031 271 | 7/1981 |
| WO | WO 97/45365 | 12/1997 |
| WO | 9853906 A1 | 12/1998 |

OTHER PUBLICATIONS

Chen et al. "Designing Reinforcing Fillers for Elastomers II. Effect of Ionic Strength." Presented at a meeting of the Rubber Division, American Chemical Society. Oct. 17-20, 2000.*
European Patent Office Communication dated Feb. 9, 2007, Application No. 01979811.5-1521. (5 pages).
WO9853906(A1)-English Language Abstract only, obtained from http://ep.espacenet.com/.
Japanese Patent Office-Official Action mailing date Dec. 5, 2008 (translated version); Japanese Application No. 2002-534211, 7 pp.
R.K. Iler, The Chemistry of Silica, Wiley, New York, (1979), Title, Copyright, Table of Contents, p. 138.
WO9853906(A1)-English Language Abstract only, obtained from http://ep.espacenet.com/, Dec. 3, 1998.

* cited by examiner

*Primary Examiner*—Stanley Silverman
*Assistant Examiner*—Paul Wartalowicz
(74) *Attorney, Agent, or Firm*—Wood, Herron & Evans, L.L.P.

(57) ABSTRACT

The synthesis of precipitated silica having improved chemical and physical properties of use as a reinforcing filler in polymeric matrices is described. Improvements in the properties result from the synthesis of the silica at a reduced ionic strength. In particular, the use of silicia acid during synthesis, provides a solution of reduced ionic strength, which favors the formation of improved colloidal structure via increased aggregation and reduced agglomeration. In addition, the surface of the silica precipitate formed may be modified by the addition of surface modifying agents, during synthesis to further enhance the desired reinforcing properties of the precipitated silica. The invention also embodies polymeric compositions of improved tensile and elongation strengths, with the compositions including precipitated silica, synthesized at reduced ionic strengths and having modified surfaces, in combination with a polymeric compound.

2 Claims, No Drawings

METHODS FOR SYNTHESIZING PRECIPITATED SILICA AND USE THEREOF

CROSS-REFERENCE TO RELATED APPLICATIONS

The present application claims priority to U.S. Provisional Application Ser. No. 60/240,597 filed Oct. 13, 2000, entitled "Synthesis of Precipitated Silica at Reduced Ionic Strength," and U.S. Provisional Application No. 60/239,993 filed Oct. 13, 2000, entitled "Improved Reinforcing Fillers Using Steric Stabilization," the disclosures of which are incorporated herein by reference. This application also claims priority to PCT Application No. PCT/US2001/032114 filed Oct. 12, 2001, the disclosure of which is incorporated by reference herein.

FIELD OF THE INVENTION

The invention relates to a method of synthesizing precipitated silica of improved colloidal structure. More specifically, the invention relates to a method of synthesizing precipitated silica by reducing the ionic strength of the reaction solution and modifying the surface of the silica precipitate.

BACKGROUND OF THE INVENTION

Colloidal fillers have been widely used in industry for almost a half a century as reinforcing agents for rubber and other polymers. Fillers such as silica and carbon provide useful reinforcing agents for rubber due to their colloidal structure. Colloidal structure is primarily a function of the colloidal interactions which define the morphology and strength of the colloidal structure. Colloidal interactions are interactive chemical and physical forces between individual particles, and between clusters of particles. Such chemical and physical forces typically include chemical bonds, and ionic associations such as hydrogen bonding, hydrophobic interactions, electrostatic interactions and Van der Waal's forces. The interrelationship of these forces ultimately defines the overall structural characteristics of the filler.

Silica, as compared with carbon black, the traditional reinforcing agent, offers not only improved mechanical properties as a reinforcing filler in polymer applications, but also the possibility of the polymer being translucent or neutral in color. Silica, therefore, has been the preferred filler for reinforcement in many rubber and polymeric materials. Commercially available silica is typically present as precipitated silica. Precipitated silica has a three-level structure, composed of primary particles, aggregates and agglomerates. Primary particles are the first to form during synthesis of silica and the smallest structural component, typically less than one micron in size. Primary particles tend to cluster together during synthesis to form aggregates which are also typically less than one micron in size. Generally, aggregates form from intermolecular chemical bonding between individual primary particles. Chemical bonds are robust making the aggregates "hard", in the sense that they do not easily break up under shear and pressure. Primary particles and aggregates play a crucial role in polymer reinforcement.

Silica precipitate also exists in an agglomerated state. Agglomerates are 100 µm clusters of aggregates. Generally, agglomerates form from physical bonding between aggregates during the synthetic process. Physical bonds are not as robust as chemical bonds and are easily broken down during shear. Agglomerates tend to be much larger and "softer" than the corresponding aggregates. Physically bound agglomerates in and of themselves are fairly ineffective as reinforcing fillers due to their softness and large size. However, formation of agglomerates provides convenience for packaging and transportation of the final silica product.

During the rubber reinforcement process, however, the colloidal structure of the precipitated silica filler is exposed to tremendous shear and disruptive forces. Shear causes "soft" agglomerates to be broken down into corresponding "hard" aggregates. This leads to improved dispersion of the silica reinforcing filler. Therefore, to improve the performance of a reinforced rubber, an ideal silica filler would be composed of both "hard" aggregates, to withstand the pressures of shear during rubber manufacture, and "soft" agglomerates, to allow for their breakdown during dispersion in the rubber matrix.

The synthesis and formation of the colloidal structure of precipitated silica may be systematically controlled using the tools of chemistry. While chemically bound aggregates are favorable, the size of the primary particles as well as the formation of aggregates and corresponding agglomerates are very important for dispersion of precipitated silica in rubber matrices. The prior art has also attempted to study the effects of varying reaction conditions on the structure of silica in order to obtain the desired structural composition and characteristics of primary particles, aggregates and agglomerates. References Chevallier U.S. Pat. No. 5,403,570, and Groel U.S. Pat. No. 5,705,137 disclose precipitated silica of varying colloidal structure as potential reinforcing agents. Chevallier discloses modified silica produced in an effort to improve dispersive properties. Groel discloses precipitated silica preparing from synthetic methods in which the pH and temperature conditions were varied. These references, however, fail to improve the colloidal structure of silica as related to reinforcement, and in particular, fail to effectively control the formation of aggregates and agglomerates of the silica precipitate.

OBJECTIVES OF THE PRESENT INVENTION

The present invention overcomes the limitation described above by focusing on the synthetic reaction conditions during the formation of precipitated silica. Controlling the environment in which the silica forms provides a better or improved colloidal structure for use as a reinforcing filler. Specifically, the present invention affects the ionic strength of the reaction solution during formation of primary particles, aggregates, and agglomerates of silica, thereby controlling the formation of "hard" agglomerates. The present invention also lends itself to the synthesis of precipitated silica having modified surfaces and improved hydrophobic characteristics for use as a reinforcing filler.

Accordingly, it is an object of the present invention to synthesize precipitated silica at reduced ionic strength.

It is another object of the present invention to control the rate of aggregation and effectively suppress agglomeration during the synthesis of precipitated silica thus limiting the formation of hard agglomerates.

It is yet another object of the present invention to modify the surface of silica during its synthesis to improve its dispersive properties.

It is yet another object of the present invention to synthesize precipitated silica with a colloidal structure having improved chemical and physical properties and therefore, with improved reinforcing properties.

Yet another object of the present invention is to provide a polymeric composite containing the precipitated silica with improved tensile and elongation strengths.

SUMMARY OF THE INVENTION

The present invention is directed to a method of synthesizing precipitated silica, a method of modifying the surface of the silica during synthesis, and a polymeric composite which incorporates the precipitated silica. The method of synthesizing silica precipitate generally comprises the addition of silicic acid to a silicate solution in an amount sufficient to form silica precipitate. Silicic acid, when added to a silicate solution, such as a sodium silicate solution, affects the ionic strength of the silicate solution, and in particular, reduces the ionic strength.

The present invention also embodies the addition of a surface modifying agent to the silicate solution. A surface modifying agent is an reagent capable of coupling to free hydroxy groups in the forming silica precipitate. The surface modifying agents of the present invention may be silanes including alkyl, aryl, and halogen substituted silanes. Some representative examples are mercapto-propyltriethoxysilane, dimethyl-dichloro silane, and bis(3-triethoxysilyl propyl)tetrasulfanol. This surface modifying agent is added during the synthesis of a silica precipitate, with or without silicic acid, to produce precipitated silica having modified surfaces. Such surface modification generally improves the hydrophobic characteristics of the silica precipitate.

The present invention further embodies adding a neutralizing agent to a sodium silicate solution, in a plurality of addition steps, during the reaction. Silicic acid is one of the neutralizing agents added. Alternatively, a neutralizing agent can be added simultaneously with sodium silicate to the sodium silicate solution.

One embodiment of the present invention involves a method of synthesizing silica precipitate with the addition of silicic acid comprising the steps of: partially neutralizing a sodium silicate solution with a first acid, heating the sodium silicate solution, adding silicic acid to the sodium silicate solution, acidifying the sodium silicate solution to form a slurry, and forming a silica precipitate from the slurry. The silica precipitate can be formed by filtering the resulting slurry, washing the slurry with water, and drying the slurry. Another neutralizing agent may be added in this method after the addition of silicic acid.

The embodiment described immediately above may further include adding a surface modifying agent to the sodium silicate solution. Alternatively, the same surface modifying agent may be added to the sodium silicate solution a second time, with a neutralizing agent, after the addition of the silicic acid. If desired, the silicate solution is stirred, during and after each step, at any temperature, in the synthesis of the silica precipitate.

Another embodiment of the present invention is a method of forming silica precipitate comprising the steps of: partially neutralizing a sodium silicate solution with sulfuric acid in a first addition step, heating the sodium silicate solution with stirring, adding silicic acid to the sodium silicate solution in a second addition step, stirring the sodium silicate solution at a temperature between 60-95° C., adding a neutralizing agent to the silicate solution in a third addition step, to reduce the pH of the sodium silicate solution within a range of 7.5-8.5, acidifying the sodium silicate solution to a pH in the range of 4.5-6.5 to form a slurry, and forming a silica precipitate from the slurry by filtering the slurry, washing the slurry with water, and drying the slurry. This embodied method may additionally comprise adding a surface modifying agent during the second addition step, where the surface modifying agent is a silane, such as the representative examples mentioned earlier.

Yet another embodiment of the present invention is a method of synthesizing silica precipitate comprising the steps of: adding silicic acid to a sulfuric acid solution having a pH in the range of 4.0-5.0, in a first addition step, heating the sulfuric acid solution with stirring, adding a neutralizing agent to the sulfuric acid in a second addition step, stirring the sulfuric acid solution to form a slurry, and forming a silica precipitate from the slurry by filtering the slurry, washing the slurry with water, and drying the slurry. This method may further embody adding a surface modifying agent, such as a representative silane above, to the sodium silicate solution during the first addition step.

Yet another embodiment of the present invention is silica precipitate synthesized from the method comprising the addition of silicic acid to a silicate solution, the general method of synthesizing silica precipitate, and the other methods embodied above, comprising particles having a radius between 4.0-5.4 nm, and a surface area relative to mass as measured by the absorption of nitrogen(BET) between 280-350 $m^2/g$.

Yet another embodiment is silica, synthesized by the general method comprising the addition of a surface modifying, and the other methods comprising the addition of a surface modifying agent, as embodied above, having a water floatation percentage in the range of 5-100%.

Yet another embodiment of the present invention is a polymeric composite comprising a curable polymeric compound, for example, rubber, in combination with the silica synthesized by the embodied method comprising the addition of silicic acid to a silicate solution, the general embodied method, both optionally comprising the addition of a surface modifying agent, and the other embodied methods above. The above embodied polymeric composites have tensile strengths of between 1.6-5.0 MPa at break, and elongation between 9.0-18.0 MPa at break.

The present invention is not limited to the embodiments disclosed above. Other objects and advantages and a full understanding of the invention will be had from the following detailed description of the invention.

DETAILED DESCRIPTION OF THE INVENTION

The present invention is directed to a method of synthesizing precipitated silica, a method of modifying the surface of the silica during synthesis, and a polymeric composite which incorporates the precipitated silica. The method of synthesizing silica precipitate improves colloidal structure, thereby making it better adapted for use as a reinforcing filler in a polymeric composite. To improve the reinforcement properties of silica, silicic acid is added to a silicate solution as part of the silica precipitate synthesis process. The addition of silicic acid to the silicate solution during synthesis reduces the ionic strength of the solution, which influences the formation of the silica primary particles, aggregates and agglomerates. The result is a precipitated silica composition comprising hard aggregates and 'softer' agglomerates.

The present invention also focuses on synthesizing surface modified silica precipitate, via the addition of surface modifying agents during synthesis. The result is silica having increased hydrophobic characteristics which leads to better dispersion in polymer matrices. The present invention, therefore, results in a colloidal structure with improved chemical, physical and mechanical properties. These improved properties are especially beneficial in polymer reinforcement.

The synthesis of silica precipitate comprises the step of adding silicic acid to a silicate solution, such as a sodium silicate solution. As used herein, the term 'silica precipitate' generally encompasses all physical forms of silica precipitates, including, for example, but not limited to, powders, clumps, blocks and the like. Silicic acid used in the present invention is a weak acid having a small dissociation constant, thereby allowing for lower ionic strength in solution. In addition, fewer small ions are produced during the polymerization of silicic acid compared to sodium silicate. Silicic acid may be generated and used from any source. Generally, silicic acid can be purified from a commercially available silicate-salt solution or conventional solutions, such as water glass, with a molar ratio of $SiO_2:Na_2O$ of 2.5:1-3.5:1. A variety of commercially available salts of silicate solutions, including, but not limited to sodium, potassium, calcium and the like, may be used. Procedures of obtaining silicic acid by passing a diluted sodium silicate solution through an ion-exchange resin bed or column have been thoroughly reviewed in Iler's book. If desired, the aqueous silicic acid used in the present invention may be prepared by passing a diluted sodium silicate solution quickly through a column filled with cationic resin, for example, Amberlite IRN-77, to prevent gelling of the silicic acid on the column. Once eluted from the column, the silicic acid generally has a concentration in the range of 0.5-2.0M, and a pH in the range of $2.0\pm0.5$. This effluent can be diluted further with more effluent, or distilled water to a pH of about 3.5, and is then immediately used in the synthesis of silica precipitate or stored at refrigerated temperatures for later use. If the silicic acid is stored for periods longer than a few hours, its pH will need to be lowered, by adding acid, to prevent gel formation during storage. Amberlite IRN-77 resin is commercially available in a nuclear grade from Alfa Inc.

The following description will provide general and detailed information regarding each step of the methods embodied in the present invention. The synthesis of precipitated silica generally may take place in any suitable vessel depending on the desired scale of the synthesis. The vessel is subjected to a heating source capable of heating and regulating the temperature of the contents of the flask to elevated temperatures, for example, to a temperature of about 150° C.

Silicate-salt solutions from which the silica precipitate is synthesized are generally basic solutions of pH>12.0, preferably >14.0, having known counter-ion salts including, but not limited to, sodium, potassium, calcium and the like. The silicate solutions are generally aqueous solutions and may be further diluted 1x-4x with distilled water to form the desired silicate concentration to begin the synthesis of silica. In a preferred embodiment the silicate salt is sodium. The sodium silicate, also referred to as $Na_2SiO_3$, used in the present invention may be any commercially available aqueous sodium silicate solution of varying $SiO_3:Na_2O$ ratios, typically mole ratios between 2.5-3.5:1.0 respectively. If desired, the $Na_2SiO_3$ solution available from PPG Industries with a $SiO_3:Na_2O$ mole ratio of 3.3:1.0, and an approximate silicate concentration of 3.75M may be used in the present invention. The PPG $Na_2SiO_3$ solution may be further diluted with distilled water to a desired silicate concentration of approx. 0.8-2.0M to form the initial silicate solution.

Synthesis of silica precipitate begins by partially neutralizing the initial silicate solution, herein referred to as a first addition step, to a pH between 7.5-10.0 with the addition of an acid. As used herein, neutralization is intended to mean a decrease in the pH of a solution by the addition of a neutralizing agent capable of lowering the pH. The term "neutralization" as used herein, in reference to a basic, silicate-salt solution, is intended to mean desalting or free basing the salted silica in solution with the addition of an acid thereby lowering the pH of the silicate solution. Neutralizing agents used to partially neutralize the initial silicate solution generally include strong inorganic acids, such as sulfuric acid, nitric acid, hydrochloric acid and the like, but may also include weaker organic acids such as carbonic acid, formic acid and the like. In one embodiment of the present invention, the initial silicate solution, having a 0.8-2.0 M silicate concentration, is partially neutralized with an acid, such as concentrated sulfuric acid (96.5%), to a pH in the range of 7.5-10.0 as desired. Typically, the solution is partially neutralized to a pH of about 9.0. To achieve this pH, acid is typically added in an amount sufficient to free-base or neutralize approximately 80% of the silicate-salt in the solution. Partial neutralization generally occurs by dropwise addition of the acid over 15-100 minutes at a temperature range of 20-40° C. An alternate temperature range is 32-35° C.

The partially neutralized sodium silicate solution is then generally heated to a higher temperature, typically in the range of 60-100° C., alternatively between 70-98° C., while stirring the solution vigorously, in a step known in the art as 'aging'. In one embodiment, the temperature is raised to 90-95° C. and stirred at that temperature for 30-60 minutes. Stirring may be accomplished with a stir bar, a mechanical stirrer, an air pressure driven stirrer or any device capable of providing vigorous stirring to the reaction solution. This 'aging' step generally begins the nucleation and formation of the silica primary particles. Aging is one of the critical factors for formation of improved colloidal structure and therefore, heating and stirring may occur during any and all stages of the synthesis. 'Aging' allows reinforcement of the silica by strengthening or 'hardening' the aggregates by virtue of increasing the chemical bonding between the primary particles, while reducing or 'softening' agglomerates by inhibiting chemical bond formation between aggregates.

After aging the partially neutralized silicate solution, silicic acid is added to the silicate solution. This step is herein referred to as a second addition step. In this addition step, silicic acid serves as both a neutralizing agent and a source of silica. Silicic acid, is added in an amount sufficient to further neutralize the sodium silicate solution to a pH range of 7.5-9.0, optionally about 8.5, by use of, but not limited to, a syringe pump or a peristaltic pump. A peristaltic pump may be used for adding larger quantities as desired. The use of a pump to add the silicic acid allows for uniform rates of addition thereby controlling the ionic strength of the solution. The desired rate of addition typically is a rate sufficient to add the entire amount of the reagent in the time period desired. As an example, adding 100 ml of silicic acid over about 90 minutes will be an addition rate of about 1.1 ml per minute. The silicic acid added in the present invention typically is an aqueous solution having a concentration in the above described range of 0.8-2.0M, and is added to the silicate solution at elevated temperatures, such as in the range of 90-95° C. This second addition step is not limited to the addition of silicic acid, but may also include the addition of other agents, such as a surface modifying agent, as discussed further below.

The silicate solution is then acidified by the addition of an acid while stirring the silicate solution to form a slurry. The acid may be a strong or weak acid, preferably sulfuric acid, added in an amount sufficient to lower the pH of the silicate solution between 3.0-6.5, generally between 4.5-5.5. The silicate solution is acidified typically at the temperature at which silicic acid was added, but may also be acidified at lower temperatures, even at room temperature. Addition times of the acid are not as critical and may take as long as 20-30 minutes.

The acidified silicate solution is cooled to room temperature, either during acidification or after, and the resulting solution is stirred to form a slurry of precipitated silica. Generally, a uniform slurry will form after stirring the solution for period of 10-60 minutes. The slurry is then processed to form a dry powder of silica precipitate by filtering the slurry, washing the slurry with water, and finally drying the slurry. Filtering may be accomplished with use of a fritted disc filter or any such filtering device, preferably fitted to a vacuum source. Once the solution is filtered, the residue of silica, hereinafter referred to as filter cake, is washed with water to remove the water-soluble salts and impurities. The filter cake may be washed with an amount of water sufficient to rid the filter cake of all water-soluble impurities. The filter cake may be dried by any conventional drying means known in the art. Conventional means include, but are not limited to, spray drying, UV lamp drying, vacuum drying, and the like known in the art. It is preferred that vacuum drying be carried out in a vacuum oven capable of heating to at least 100° C. in order to eliminate the any remaining water trapped in the silica.

The present invention also is directed to a method of modifying the surface of silica during the synthesis of silica precipitate. The surface of silica may be modified by the addition of a surface modifying agent to the silicate solution during synthesis. The term "surface modifying agent" as used herein, is intended to refer to an agent capable of adding to, organically or inorganically, a free hydroxy group in the forming silica primary particles and aggregates. In particular, the surface modifying agents react in such a way to effectively replace the hydrogen of the hydroxy group with the modifying agent. Such additions to these hydroxy groups to form ether groups result in increased hydrophobic characteristics of the synthesized silica. Increased hydrophobicity improves the dispersion of the silica when introduced into a polymer composite. Surface modifying agents also reduce robustness of the agglomerates, further enhancing dispersion in polymers.

A surface modifying agent can be added with silicic acid in the second addition step, as mentioned above. The addition of this modifying agent is not limited to the second addition step, but also may be added with other agents in any subsequent addition step as desired. In the second addition step, the surface modifying agent may be added concurrently with the silicic acid or immediately following the addition of silicic acid, but before the subsequent acidification of the silicate solution. The amount of modifying agent added depends upon the concentration and quantity of silica in solution. It is desired to add an amount sufficient to substitute all the free hydroxy groups in solution. The addition time will vary depending upon the amount of modifying agent added and the addition system used. Generally, addition over a period of 10-30 minutes is sufficient, preferably about 20 minutes. The modifying agent is typically added to the reaction solution at elevated temperatures, for example, temperatures between 80-95° C.

The embodied method of synthesizing a silica precipitate does not limit the addition of a modifying agent to the second addition step. The same modifying agent may also be added to the silicate solution with other agents in any subsequent addition step as desired. For example, the surface modifying agent may be added with a neutralizing agent, to the sodium silicate solution, in a third addition step. The temperature, addition time, and amount of the surface modifying agent added in such a third addition step would generally resemble that of the second addition step.

The surface modifying agent may be any agent, such as a silane, which is capable of adding to the hydroxy groups of the forming silica. The surface modifying agents used in the present invention may be either commercially available or privately prepared. Surface modifying silanes may be any silane capable of adding to a free hydroxy group in solution. As an example, the silane may be, but is not limited to, alkyl substituted silanes, aryl substituted silanes, halide substituted silanes, and combinations thereof. One embodiment of the method of synthesizing precipitated silica comprises adding a surface modifying silane, such as mercapto-propyltriethoxysilane (MS), dimethyl-dichloro silane (DMDCIS), or Bis(3-triethoxysilyl propyl)tetrasulfanol (referred to as A1289), to the silicate solution. These silanes are all commercially available. Mercapto-propyltriethoxysilane (MS) is available from Industrial Science and Technology Network in York, Pa., Dimethyl-dichloro silane (DMDCIS) is available from Aldrich Chemical Company, and Bis(3-triethoxysilyl propyl)tetrasulfanol is available from Witco Company.

The surface modifying agent generally may be formulated prior to addition into the silicate solution. Typically, due to solubility or incompatibility reasons, the surface modifying agents are preferably completely dissolved or partially dissolved in a solvent, such as an alcohol or a mixture of alcohol and water, in order to be added to the silicate solution. The surface modifying silanes of the present invention, are not readily soluble in the aqueous silicate solution and are therefore dissolved or suspended in alcohol or mixtures of alcohol and water. If desired, isopropanol may be used either with or without water, to formulate the surface modifying agent. The proportion of alcohol and water is adjusted as necessary to dissolve the silane and prepare it for addition to the silicate solution.

Surface-modified silica is more hydrophobic than surface free silica. Hydrophobicity may be characterized by a water-flotation test. Water flotation analysis, a function of water solubility, is simply the percentage of the silica powder sample which floats (insoluble) on a water surface relative to that which doesn't (soluble). The water-flotation percentages of the surface-modified silica are compared to the corresponding percentage of a non-surface-modified silica powder. Typically, non-surface-modified silica, having surface free hydroxy groups capable of hydrogen bonding to water, is hydrophilic, and will completely dissolve in water and have a 0% water flotation. Generally, surface-modified silica has increased water flotation percentages, as seen in the examples III-IV. Particularly, the surface-modified silica precipitate synthesized with the addition of silicic acid has far greater hydrophobicity than non-surface-modified silica, as seen in Examples III and IV. A general method to test for water flotation is as follows: A vacuum dried sample, such as 0.2 g, is poured onto the surface of distilled water, such as 20 ml in a small vial, at room temperature. By observing, filtering and weighing the amount of the insoluble sample floating on the surface of the water, one can assess the hydrophobicity as a percentage based on the amount of the starting sample. If all the dry powder floats, the sample is considered 100% hydrophobic and given a 100% water flotation value.

The method may also comprise adding a neutralizing agent to the sodium silicate solution in subsequent addition steps, such as a third addition step. The amount of the neutralizing agent added depends upon the pH and concentration of the reaction solution. Generally, the amount would be sufficient to maintain the pH of the silicate solution in the range of 7.5-8.5 during such an addition step. The neutralizing agent may be added at an elevated temperature, such as between 90-95° C., dropwise over a period of 30-90 minutes, or over a period of between 30-60 minutes. The neutralizing agent may be any strong or weak acid, such as silicic acid. In order to achieve the desired pH, the neutralizing agent may be added simultaneously with a silicate solution. In such a case, the silicate solution used is the same as used in the initial silicate solution.

The silicate solution may be stirred and "aged" during and between a third and subsequent addition steps. Stirring may occur with heating at elevated temperatures, such as between 60-90° C., allowing the silica precipitate to 'age' and be reinforced. Stirring between such subsequent addition steps typically lasts between 30-100 minutes.

A further embodiment is a method of synthesizing silica precipitate by partially neutralizing a sodium silicate solution of a silicate concentration of about 1.0M by adding concentrated sulfuric acid in a first addition step, over a period of 30-60 minutes at a temperature between 30-35° C. The amount added is sufficient to lower the pH of the silicate solution to a range of 8.5-9.5. The solution is then heated to a temperature between 60-95° C. for a period of 30-60 minutes with stirring. Silicic acid is added in an amount sufficient to lower the pH of the silicate solution to about 8.0, in a second addition step. The sodium silicate solution is stirred at a temperature between 60-95° C. for a period between 30-90 minutes. A neutralizing agent, either sulfuric acid or silicic acid, is added to the sodium silicate solution in an amount sufficient to maintain the pH of the sodium silicate solution between 7.5-8.0, in a third addition step. The silicate solution is acidified, by adding an acid, such as concentrated sulfuric acid, in an amount sufficient to achieve a pH range between 4.5-6.5. The silicate solution is stirred and cooled to form a slurry of silica precipitate. The slurry is then converted to a silica precipitate by filtering the slurry, washing the slurry with water, and finally drying the slurry.

The method of synthesizing silica precipitate, under reduced ionic strength as well as synthesizing surface modified silica, may begin with an initial solution of acidic pH. One embodiment is a method comprising the steps of adding silicic acid, in an amount sufficient to achieve a pH between 4.5-5.5, to a sulfuric acid solution of a pH>5.5, at a temperature of about 32° C. over about 30 minutes in a first addition step. The initial sulfuric acid solution may be a dilute aqueous solution to achieve a mildly acidic pH. The sulfuric acid solution is then heated to a temperature between 60-95° C., preferably about 93° C. with stirring for a period of between 60-90 minutes. A neutralizing agent, such as silicic acid or sulfuric acid, is added in an amount sufficient to maintain the pH between 3.0-4.5, preferably about 4.0, in a second addition step. The sulfuric acid solution is then stirred at an elevated temperature, preferably about 93° C. to form a slurry, and the slurry is filtered, washed with water, and dried to form a powder of silica precipitate.

There are many conventional methods to characterize colloidal silica, including techniques such as electron microscopy, and nitrogen absorption (BET). These techniques are generally used to characterize the morphology of silica, such as particle size and surface area. Silica precipitate, synthesized from the methods embodied above, are characterized as comprising primary particles having particle radii between 4.0 and 5.4 nm, and a surface area per unit mass between 280-350 $m^2/g$. Conventional techniques, known in the art, such as x-ray, neutron, and light scattering techniques, and nitrogen absorption, were used to obtain data from the silica precipitate synthesized according to the methods of the present invention. This data was used to calculate the particle radius and the surface area of the synthesized silica precipitate.

Silica precipitate synthesized from the present invention may be used as, but not limited to, a reinforcing agent in elastomeric and other polymeric compositions. Generally, the silica precipitate of the present invention may be added in any suitable amount, using conventional methods known by those skilled in the art, to a curable polymer base, to form the polymer composites embodied herein. For example, one such polymer base may be rubber, to which silica precipitate prepared from the general method above, is combined in a sufficient amount, to produce a rubber composite.

The invention will be further appreciated in light of the following detailed examples.

EXAMPLE I

To a solution of $Na_2SiO_3$ (40 ml; PPG Co. solution of 3.3:1.0 mole ratio of $SiO_2:Na_2O$) and distilled water (420 ml) in a 1000 ml 3-necked round bottom fitted with a heating source and a mechanical stirrer was added concentrated $H_2SO_4$ (2.6 ml) via a syringe pump at the rate of 4.3 ml/hr, at a temperature between 33-35° C., in a first addition step. The temperature was raised to 95° C. with stirring while additional distilled water (75 ml) was added. Silicic acid ($H_2SiO_3$, 130 ml of a 1.0M solution) was added in a second addition step at 93° C., while maintaining the pH at about 8.5, over 90-100 minutes. The solution was stirred at 93° C. for 25 minutes. Concentrated sulfuric acid (1.52 ml) was added simultaneously with sodium silicate (18 ml; PPG Co.) over 30 minutes at 95° C. in a third addition step. The reaction solution was stirred for 20 minutes, acidified to pH 3.0 with concentrated sulfuric acid and stirred to give a slurry of precipitated silica. The slurry was filtered, washed with distilled water (2 to 5×300 ml)), and dried by infra red lamp followed by vacuum to give a 15.3 gm powder of silica precipitate, Example I.

EXAMPLE II

To a solution of $Na_2SiO_3$ (15 ml; PPG Co.) and $H_2O$ (85 ml) at pH>12.0 was added silicic acid (200 ml of an aqueous 1.0M silicic acid solution) dropwise at a rate of 60 drops/min. at 40° C. over 25 minutes with stirring to reduce the pH of the solution to about 10.0. The solution was heated to 60° C. and more silicic acid (115 ml; same source as above) was added over 10 minutes at pH 10 at about 40° C. The temperature of the $Na_2SiO_3$ solution was then raised to 93° C., at which time concentrated $H_2SO_4$ (0.6 ml) was added over 25 minutes to reduce the pH of the solution to 8.5. The reaction was stirred for 30 minutes at 93° C. Silicic acid (0.1 ml; same source as above) was added over 30 minutes at 93° C. $Na_2SiO_3$ (8 ml; PPG Co.) was added simultaneously with conc. $H_2SO_4$ (1.4 ml) dropwise over 25 minutes to acidify the reaction to a pH between 4.0-5.0. The resulting solution was stirred while cooling to form a slurry. The slurry was filtered, washed with distilled water (2 to 5×300 ml), and dried under an IR lamp followed by vacuum to give 32 gm powder of silica precipitate.

EXAMPLE III

To a solution of $Na_2SiO_3$ (8 ml; PPG Co.) and $H_2O$ (50 ml) is added $Na_2SiO_3$ (9 ml) and silicic acid (100 ml) in a first addition step over 40 minutes at 39° C. The reaction temperature was raised to 95° C. and stirred for 15 minutes. The surface modifying silane DMDCLS (1.0 gm dissolved in 10 ml IPA) was added dropwise into the reaction solution at a pH of 9.0-11.0 over 15 minutes. Silicic acid (120 ml) was added dropwise over 35 minutes at 82-90° C. to reduce the pH to about 8.5. More DMDCLS (1.1 gm in 30 ml IPA) was added dropwise to the reaction solution over 60 minutes at about 92° C. $Na_2SiO_3$ (5 ml; PPG Co.) was added to the reaction solution to adjust the pH at about 8.0. The solution was acidified with silicic acid (35 ml) to pH about 5.0 and stirred to form a slurry. The slurry was filtered, washed with distilled water (2 to 5×300 ml)), and dried under vacuum to give 18 gm powder of silica precipitate having a 30% water flotation value.

EXAMPLE IV

Silicic acid (100 ml) was added dropwise over 25-30 minutes to a sodium silicate(9 ml; PPG Co.) diluted with $H_2O$ (150 ml) at 65° C. The temperature was raised to 95° C. and additional silicic acid (165 ml) was added dropwise to the reaction to result in a pH of 8.5. A solution of the surface modifying silane, A1289, (2.18 gm dissolved in 40 ml IPA; A1289 is commercially available) was added to the reaction dropwise over 30 minutes at 93° C. The pH was adjusted to about 5.5 with a few drops of conc. $H_2SO_4$. The reaction was stirred for 10-15 minutes, and cooled to room temperature to form a slurry. The slurry was filtered, washed with distilled water, and dried under vacuum to give about 13.0 gm of a powder of silica precipitate, having a 60% water flotation value.

The results from scattering analysis of examples 1, 2, 3, and 4, are presented below in table 1.

TABLE 1

| Sample | Density[a] $\rho(g/cm^3)$ | Particle radius $R_p{}^b$ (nm)(±0.5) | $S_m$ (from radius $R_p$)($m^2$/g)(±40) | $S_m$(SAXS) ($m^2$/g)(±40) |
|---|---|---|---|---|
| Example I | 0.42 | 4.8 | 313 | 455 |
| Example II | 0.58 | 4.9 | 306 | 525 |
| Example III | 0.50 | 5.0 | 300 | 496 |
| Example IV | 0.58 | 4.8 | 312 | 465 |

[a] $\rho$ is the bulk density of silica.
[b] $R_p = (5/3)^{1/2} R_g$, $R_g$ is from Guinier fit by small angle x-ray scattering
[c] the difference in surface area obtained by SAXS through relative method and BET.

EXAMPLE V

To a solution of $Na_2SiO_3$ (40 ml; PPG Co.) in distilled $H_2O$ (460 ml) at 31° C. was added $H_2SO_4$ (3.2 ml) over 30 minutes. Gradually, the temperature was raised to 93° C. over 45 minutes and the reaction was stirred for 15 minutes at 93° C. Sodium silicate (40 mls; PPG Co.) was added, at a rate of 0.4 ml/min, simultaneously with conc. $H_2SO_4$ (2.8 ml), added at a rate of 1.4 ml/hr., to the $Na_2SiO_3$ solution. A solution of the surface modifying silane MS (24 gms dissolved in a solution of 50 ml IPA and 70 ml $H_2O$) was added at 88° C. over 8 minutes. The reaction was stirred at 90° C. for 30 minutes. Sodium silicate (18 ml)was added simultaneously with conc. $H_2SO_4$ (1.6 ml ) in a second addition step. The reaction was stirred at 90° C. for 30 minutes. The pH was adjusted to about 5.5 with a few drops of conc. $H_2SO_4$. The reaction was stirred and cooled to room temperature to form a slurry. The slurry was filtered, washed with distilled water, and dried under vacuum to give about 10.0 gm of a powder of silica precipitate, having a 5% water flotation value.

EXAMPLE VI

To a solution of $Na_2SiO_3$ (40 ml; PPG Co.) in 400 ml distilled $H_2O$ at 31° C. was added conc. $H_2SO_4$ (3.6 ml) over 30 minutes. The temperature was raised to 90° C. over 30 minutes. Sodium silicate(10 ml; PPG Co.) was added followed by the surface modifying silane, mercapto-propyltri-ethoxysilane(MS; 3.1 gm dissolved in a solution of 70 ml IPA and 30 ml $H_2O$). The reaction was stirred for 60 minutes at about 90° C. More surface modifying silane, MS, (2.5 gm dissolved in 50 ml IPA) was added over 15 minutes followed by sodium silicate (8 ml; PPG Co.) in a second addition step, over 45 minutes. The solution was acidified to pH 5.5 with conc. $H_2SO_4$ and stirred to give a slurry. The slurry was filtered, the filter cake washed with $H_2O$ (3×300 ml) then dried in a vacuum drying oven at 100° C. to give about 21.0 gm of a white powder as having a 5% water flotation value.

EXAMPLE VII

Preparation of Rubber Composite Containing Precipitated Silica

A rubber composite was produced in accordance with the quantities and method of tables 2 and 3 below, respectively, and in accordance with the knowledge of conventional compounding methods as possessed by one skilled in the art of rubber compounding.

TABLE 2

| | Material Quantities | | | | | | | |
|---|---|---|---|---|---|---|---|---|
| Component | Rubber | Silica | ZnO | Stearic acid | Processing oil | Sulfur | CBS | DPG |
| Amount | 100 | 26 | 2.5 | 1.5 | 20 | 1.5 | 2 | 1.5 |

TABLE 3

| | Rubber Compounding Procedure | | | |
|---|---|---|---|---|
| Steps | Temperature (° C.) | Components | Compounding Time (min) | Rotation Rate |
| Step 1 | 120 | rubber + oil | 5 | Fast |
| Step 2 | 120 | + ⅓ silica | 20 | Fast |
| | | + ⅓ silica | 20 | |
| | | + ⅓ silica | 20 | |
| Step 3 | 100 | + ZnO + stearic acid | 10 | Fast |
| | | cool down and repeat the | 10 | |
| | | process twice | 10 | |
| Step 4 | 55 | + CBS, S, DPG | 5 | Slow |
| | | cool down and repeat the | 10 | |
| | | process twice | 10 | |

A 9-10 gm sample of the compounded rubber according to procedure in table 3 above was weighed and transferred to the space between two aluminum sheets with a spacer controlling the thickness to 1 mm, followed by compression molding by the use of a hot press with a temperature controller. The temperature was set at 310-315° C. and the rubber sample was cured for 40 minutes under pressure. The sample was then cooled under pressure to room temperature to give a rubber sheet with a thickness of 1 mm. The mechanical properties of the rubber composite comprising rubber in combination with the silica precipitate prepared in Example 1, as a reinforcing filler, compared with a non-reinforced pure rubber sample, is presented in table 4 below.

TABLE 4

Test Results

| Sample | Elongation at break (Mpa) | Tensile strength at Break (MPa) | Modulus(Mpa) | | | Toughness |
|---|---|---|---|---|---|---|
| | | | 25% strain | 200% strain | 400% strain | |
| Pure rubber | 6.5 | 1.0 | 0.6 | 0.21 | 0.15 | 3.9 |
| Example 1 | 13.7 | 2.9 | 1.0 | 0.34 | 0.28 | 20.6 |

The present invention, a method of synthesizing precipitated silica having improved colloidal structural characteristics and improved strength by virtue of an improved ratio of aggregates and agglomerates, produces silica for use as reinforcing fillers in rubber and other polymeric materials. Reinforced rubbers may ultimately be used in products containing rubber, such as tires, household products, wire sheathing, electronic devices, personal goods and the like. The present invention is particularly useful for tire applications due to the ability to provide improved strength, improved wet traction, and highway abrasion resistance with no increase in rolling resistance.

While the present invention has been illustrated by a description of various embodiments and while these embodiments have been described in detail, it is not the intention of the applicants to restrict or in any way limit the scope of the appended claims to such detail. Additional advantages and modifications will readily appear to those skilled in the art. Therefore, the invention in its broader aspects is not limited to the specific details, representative methods, and illustrative examples shown and described. Accordingly, it is apparent that certain modifications or alterations can be made without departing from the spirit and scope of the invention set forth in the appended claims.

What is claimed is:

1. A method of synthesizing a silica precipitate adapted for use as a reinforcing filler comprising:
    (a) partially neutralizing a silicate solution with an acid to form a plurality of silica primary particles;
    (b) heating said silicate solution;
    (c) providing a silicic acid solution having a reduced ionic strength, wherein providing said silicic acid solution includes passing a diluted silicate solution through an ion-exchange resin to reduce the ionic strength of said diluted silicate solution; and
    (d) adding said reduced ionic strength silicic acid solution to said silicate solution in an amount sufficient to reduce a pH of said silicate solution to between at least 3 and 10 whereby silica aggregates form from said silica primary particles with subsequent formation of agglomerates that precipitate from the silicate solution.

2. The method of claim 1 wherein said silica precipitate comprises particles having a surface area relative to mass (BET) between 280-350 $m^2/g$.

* * * * *

UNITED STATES PATENT AND TRADEMARK OFFICE
CERTIFICATE OF CORRECTION

PATENT NO. : 7,700,062 B2
APPLICATION NO. : 10/399177
DATED : April 20, 2010
INVENTOR(S) : Schaefer et al.

It is certified that error appears in the above-identified patent and that said Letters Patent is hereby corrected as shown below:

On the Title Page, Item (54) and Col. 1, lines 1-2 in the Title: "METHODS FOR SYNTHESIZING PRECIPITATED SILICA AND USE THEREOF" should read --METHODS OF SYNTHESIZING PRECIPITATED SILICA AND USE THEREOF--.

In Column 10, line 14, "I $I_2SO_4$" should read --$H_2SO_4$--.
In Column 10, line 19, "pI I" should read --pH--.
In Column 10, line 24, "pI I 3.0" should read --pH 3.0--.
In Column 10, line 34, "at pI I>12.0" should read --at pH>12.0--.
In Column 10, line 39, "at pI I 10" should read --at pH 10--.

In Column 11, line 14, "The pI I was" should read --The pH was--.

Signed and Sealed this

Twenty-first Day of December, 2010

David J. Kappos
*Director of the United States Patent and Trademark Office*